March 29, 1949. T. J. FLAMM 2,465,720
LEVER DETENT MECHANISM
Filed May 24, 1947 3 Sheets-Sheet 1
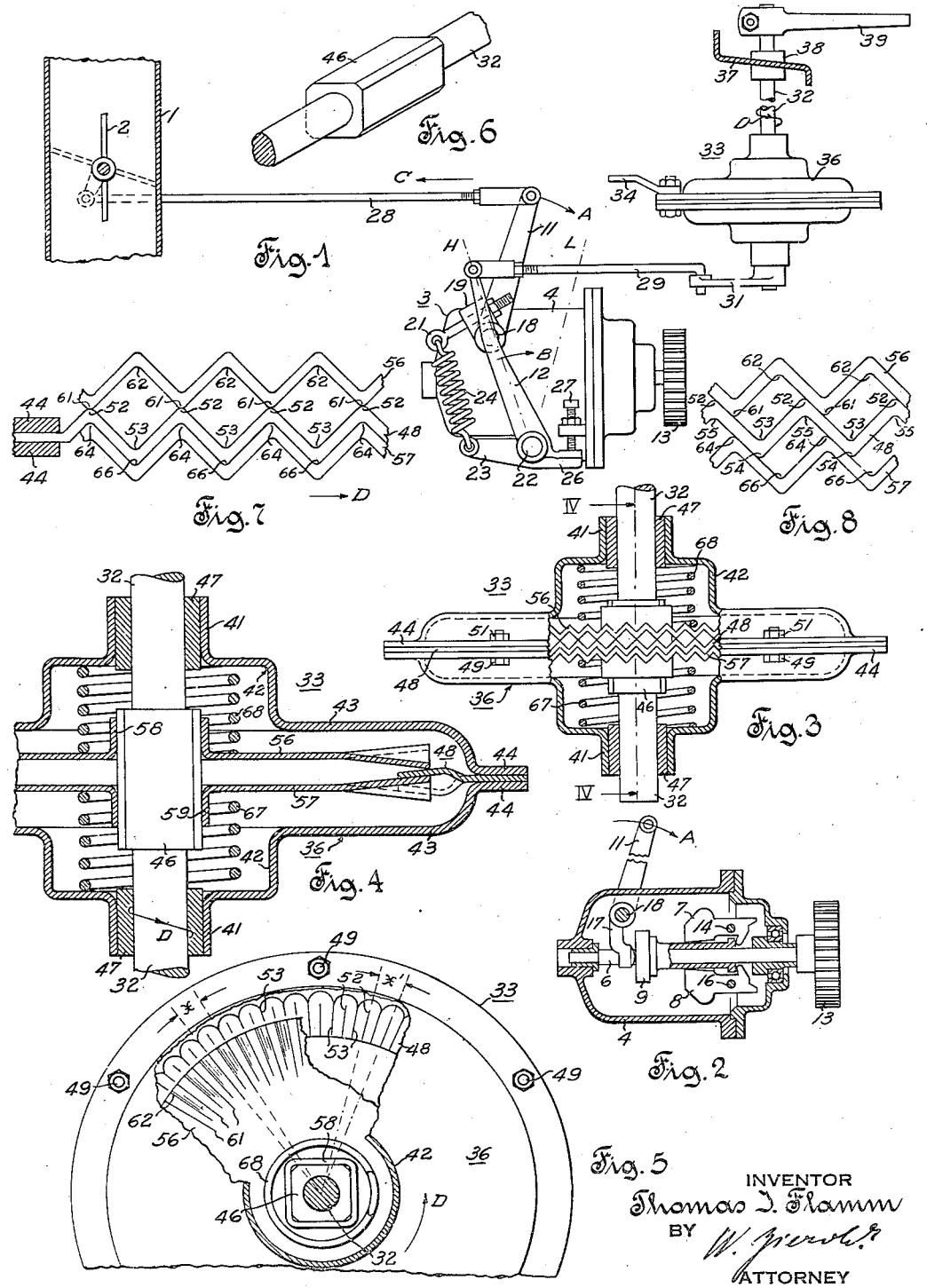
INVENTOR
Thomas J. Flamm
BY
ATTORNEY March 29, 1949.  T. J. FLAMM  2,465,720
LEVER DETENT MECHANISM
Filed May 24, 1947  3 Sheets-Sheet 2
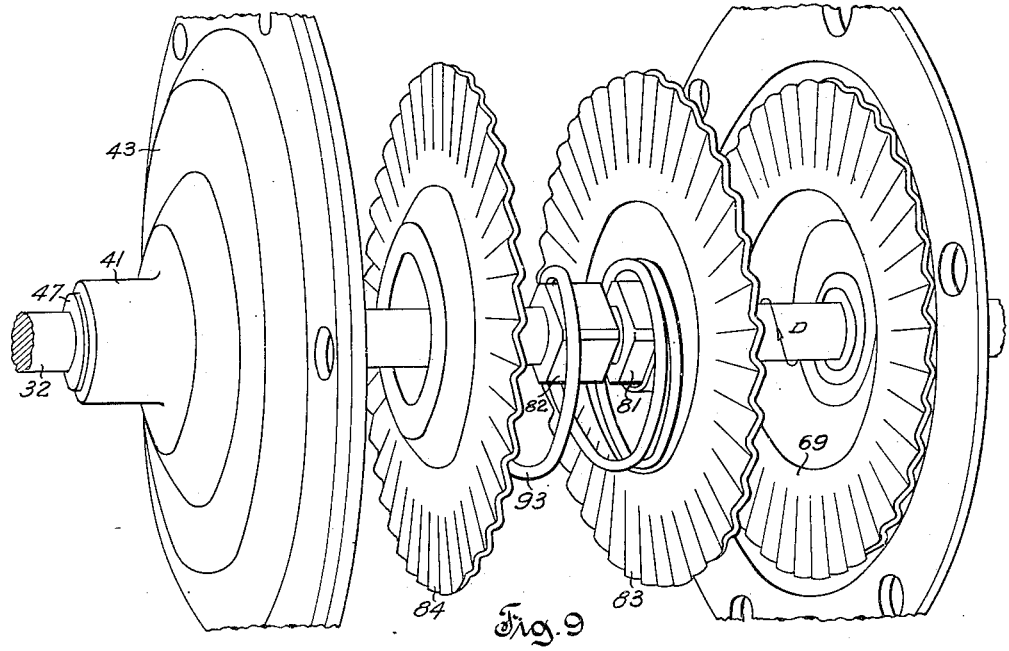
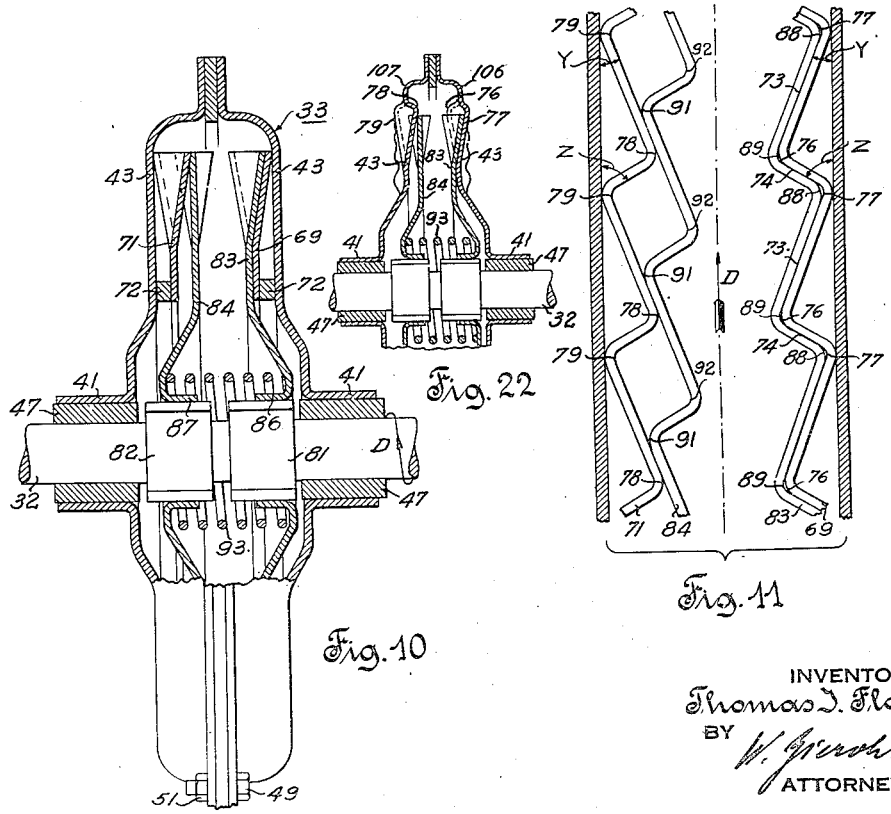
INVENTOR
Thomas J. Flamm
BY
ATTORNEY

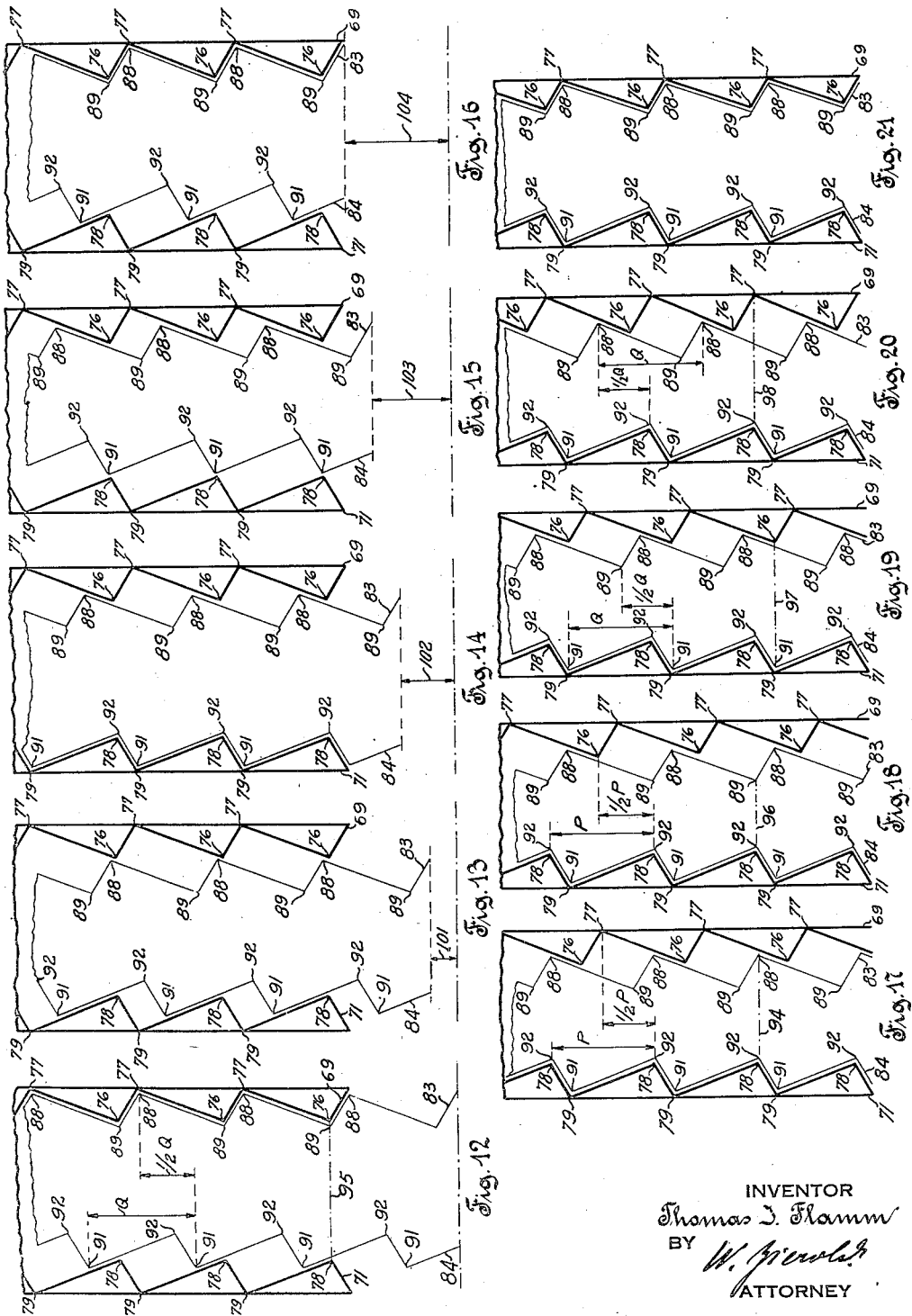

Patented Mar. 29, 1949

2,465,720

UNITED STATES PATENT OFFICE 2,465,720

LEVER DETENT MECHANISM

Thomas J. Flamm, Springfield, Ill., assignor to Allis-Chalmers Manufacturing Company, Milwaukee, Wis., a corporation of Delaware Application May 24, 1947, Serial No. 750,281

21 Claims. (Cl. 74—527)

The invention relates to detent mechanisms and it is concerned more particularly with a lever detent mechanism, that is, with a mechanism for releasably securing a pivotally mounted lever or the like in desired position of pivotal adjustment.

Certain types of lever detent mechanisms have heretofore been suggested which function automatically, that is, without manual control of the detent element or elements, to couple the lever with a suitable stationary support when the lever is moved to any one of a number of predetermined positions of pivotal adjustment, and to uncouple the lever from the support when an adjusting torque in excess of a predetermined limit is applied to the lever in order to move it from one to another of said predetermined positions.

Attempts have also been made during the past to provide lever detent mechanisms for use in installations which require a relatively fine adjustment of the lever, say within a few degrees, and in which the lever is normally subjected to an appreciable load which tends to turn it in one direction. Such previous attempts, however, are believed to have not been entirely successful to achieve the desired results in a fully satisfactory manner, particularly in the matter of providing a simple and compact device which may be manufactured at a relatively low cost; which may be adjusted readily and accurately by hand without requiring manual release of a pawl or the like; which when subject to vibration, as in a motor vehicle, will prevent creeping of the lever under the mentioned load; and which will withstand severe use without undue wear.

Generally, it is an object of the invention, to provide an improved lever detent mechanism of the hereinabove mentioned automatic coupling type, and one which will be fully satisfactory in the various respects which have been pointed out hereinbefore in connection with installations which require a relatively fine adjustment of the lever and in which the lever is normally subjected not only to a load which tends to turn it in one direction but also to vibrations which are apt to induce creeping of the lever under said load.

More specifically, it is an object of the invention to provide in a detent mechanism of the automatic coupling type an improved form of coupling device which functions automatically to couple the lever with a suitable stationary support when the lever is moved to any one of a number of predetermined positions of pivotal adjustment, and to uncouple the lever from the support when an adjusting torque in excess of a predetermined limit is applied to the lever in order to move it from one to another of said predetermined positions.

Another object of the invention is to provide an improved lever detent mechanism incorporating two coupling devices of the character set forth hereinabove, and in which the lever positions determined by one of said coupling devices are staggered relative to the lever positions determined by the other, one of the coupling devices being operative to secure the lever against rotation while the other coupling device is released, and vice versa.

A further object of the invention is to provide an improved lever detent mechanism in which application of a predetermined torque to the lever in one direction will be effective to release the lever for movement from an adjusted position in said one direction, and in which application of a lesser torque to the lever in the opposite direction will be effective to release the lever for movement from said adjusted position in said opposite direction.

A further object of the invention is to provide an improved lever detent mechanism of the hereinabove mentioned torque responsive character, which will function in combination with a lever having an inherent turning tendency in one direction, so that the lever may be released for adjusting movement in said one direction by application of a predetermined adjusting torque to the lever in said one direction, and so that the lever may be released for adjusting movement in the opposite direction by application of approximately the same predetermined adjusting torque thereto in said opposite direction.

A further object of the invention is to provide an improved lever detent mechanism of the hereinabove mentioned torque responsive character which affords predetermined lever positions at only a few degrees angular spacing from each other.

A further object of the invention is to provide an improved lever detent mechanism affording a plurality of closely spaced predetermined positions of adjustment as set forth hereinbefore, and in which such predetermined lever positions are equally spaced throughout the range of adjusting movement of the lever.

A further object of the invention is to incorporate the features of improvement set forth hereinbefore in a relatively compact mechanism of utmost simplicity which lends itself to manufacture at relatively low costs.

The foregoing and other objects and advantages are attained by the present invention, various novel features of which will be apparent from the description herein and from the accompanying drawings disclosing several embodiments of the invention, and will be more particularly pointed out in the appended claims.

In the drawings:

Fig. 1 is a diagrammatic view of a throttle control apparatus for an internal combustion engine;

Fig. 2 is a sectional view of a speed responsive governor incorporated in the control apparatus shown in Fig. 1;

Fig. 3 is an enlarged view, partly in section, of a lever detent mechanism incorporated in the control apparatus shown in Fig. 1;

Fig. 4 is an enlarged section on line IV—IV of Fig. 3;

Fig. 5 is a top view, partly in section, of the lever detent mechanism shown in Figs. 3 and 4;

Fig. 6 is a perspective view of portion of a shaft connected with the detent mechanism shown in Figs. 3, 4 and 5;

Fig. 7 is an enlarged edgewise development of certain coupling elements incorporated in the detent mechanism shown in Figs. 3 and 4;

Fig. 8 is a view similar to Fig. 7 showing the coupling elements in a position of relative displacement as compared with Fig. 7;

Fig. 9 is an exploded perspective view of a modified form of the lever detent mechanism shown in Figs. 3 and 4;

Fig. 10 is a side view, partly in section, of the modified form of lever detent mechanism in assembled condition;

Fig. 11 is an enlarged edgewise development of certain coupling elements incorporated in the detent mechanism shown in Fig. 10;

Figs. 12 through 16 are diagrammatic views similar to Fig. 11 and illustrating various relative positions of the coupling elements at certain stages of adjustments;

Figs. 17 through 21 are diagrammatic views similar to Fig. 11 and illustrating various possible alternative arrangements of the coupling elements;

Fig. 22 is a view, partly in section, of a mechanism similar to that shown in Figs. 9 and 10, but modified in certain respects.

The lever detent mechanism incorporating the invention lends itself to use in a variety of installations, and for purposes of exemplification, the invention has been shown in Fig. 1 as applied to a throttle control apparatus for an internal combustion engine.

Referring to Fig. 1, the pipe 1 represents the neck of an intake manifold of an internal combustion engine (not shown), and which is equipped in conventional manner with a throttle 2. The throttle 2 is under control of a variable speed governor generally indicated by the reference character 3 and which is constructed in conformity with well-known principles. The governor comprises a housing 4, a rotatable shaft 6 (Fig. 2), a pair of flyweights 7 and 8, a thrust sleeve 9, a control lever 11 and an adjusting lever 12. The shaft 6 carries a spur gear 13 for application of power thereto from a rotary part of the internal combustion engine, not shown, and the flyweights 7 and 8 are mounted to partake in the rotation of the shaft 6 and to pivot on pins 14 and 16 so that they may be thrown outwardly from the position in which they are shown in Fig. 2 when the shaft 6 is rotated. Such outward movement of the flyweights 7 and 8 causes shifting of the sleeve 9 to the left in Fig. 2, into engagement with an arm 17 which is connected with the control lever 11, so that the latter will be moved in the direction of arrow A in Figs. 1 and 2 when the flyweights 7 and 8 are thrown outwardly from the position in which they are shown in Fig. 2. The control lever 11 and the arm 17 are mounted on a shaft 18 which is rotatably mounted in the housing 4 and which also carries a mounting arm 19 (Fig. 1) for an eye bolt 21 externally of the housing 4.

The adjusting lever 12 of the governor is rotatably mounted on a stud 22 secured to the housing 4, and an arm 23 of the adjusting lever 12 is connected with the eye bolt 21 through a relatively strong spring 24. Another arm 26 of the control lever 12 is abuttable with a set screw 27 mounted on the housing 4 of the governor.

Fig. 1 shows the throttle 2 in wide open position and the adjusting lever 12 of the governor in its limit position in which it is stopped by the screw 27. The throttle 2 is connected with the control lever 11 by a link 28 which is suitably adjusted so that the flyweights 7 and 8 will occupy the position in which they are shown in Fig. 2 when the throttle is in the wide open position in which it is shown in full lines in Fig. 1. The upper end of the adjusting lever 12 is connected by a link 29 with a lever arm 31 which is non-rotatably secured to a control shaft 32, as shown at the right of Fig. 1.

A detent mechanism, generally indicated by the reference character 33 in Fig. 1 and which will be more fully described hereinbelow, is secured to a stationary bracket 34 and comprises a housing 36 in which the shaft 32 is rotatably mounted. Another bracket 37 is suitably secured in fixed position above the housing 36 and carries a bushing 38 to afford a rotary support for an upper portion of the shaft 32. A hand lever 39 is non-rotatably secured to the upper end of the shaft 32 to provide for rotary adjustment of the latter and corresponding rotary adjustment of the lever arm 31.

In the position of the parts as shown in Fig. 1, the adjusting lever 12 is restrained from moving in the direction of arrow B by the detent mechanism 33, and the spring 24 exerts considerable pull on the eye bolt 21 so that the control lever 11 will have a strong tendency to move in throttle opening direction indicated by the arrow C. Upon starting of the engine, the shaft 6 will rotate at continuously increasing speed until the centrifugal force of the flyweights 7 and 8 becomes strong enough to overbalance the tension of the spring 24 and move the throttle 2 toward its closed position which is indicated in dotted lines in Fig. 1. The engine will then continue to rotate at a certain speed which is determined by the setting of the adjusting lever 12, and in the position of the adjusting lever 12 as shown in Fig. 1, such speed will be relatively high. In other words, the full line position of the adjusting lever 12 as shown in Fig. 1 represents the high speed position of said lever, and for reference purposes, this position is indicated in Fig. 1 by the reference character H. The adjusting lever 12 may be moved from the position H to the low speed position L shown in dash-dotted lines, and to a number of intermediate positions by manipulation of the hand lever 39. The operation of the governor is substantially the same as described hereinbefore, when the adjusting lever 12 is adjusted to the low speed position L or to any intermediate position, except that the slackening of the spring 24 which results from movement of the adjusting lever 12 in the direction of arrow B in Fig. 1 will enable the flyweights 7 and 8 to overbalance the tension of the spring 24 at a lower engine speed.

Referring to Figs. 3, 4 and 5, the detent mechanism 33 which has been mentioned hereinbefore is constructed as follows: The housing 36 comprises identical upper and lower sections each of which has a central hub sleeve 41, a central cavity 42, a radial web portion 43 and an annular flange 44. The flange 44 of each housing section is suitably offset from the web portion 43 so as to provide for axial spacing of the web portions 43 in the assembled condition of the housing as shown in Fig. 4. Fig. 6 shows a perspective view of the portion of the shaft 32 which is located within the housing 36, and as best shown in Fig. 6, a portion of the shaft is radially enlarged to form an axially elongated boss 46 of substantially rectangular cross-section, the longitudinal edges of the boss being beveled and four relatively wide flat sides between the beveled edges of the boss extending parallel to the axis of the shaft 32. The shaft 32 is rotatably mounted in bushings 47 which are secured within the hub sleeves 41 of the housing sections. The axial spacing of the bushings 47 is somewhat larger than the axial length of the boss 43, and the shaft 32 is suitably secured against axial displacement relative to the housing 36 from the position in which it is shown in Fig. 4 and in which the boss 46 is equally spaced from the bushings 47.

A ring plate 48 which forms a stationary coupling section of the detent mechanism is mounted between the upper and lower sections of the housing 36. The plate 48 has a flat annular portion which is sandwiched between the flanges 44 of the housing sections, and an annular radially corrugated portion which extends radially inwardly into the space between the web portions 43 of the housing sections. A circumferential series of bolts 49 extend through registering holes of the flanges 44 and of the ring plate 48, and nuts 51 on the bolts 49 are drawn up to clamp the plate 48 between the housing sections and secure the housing sections and plate 48 in the assembled condition in which they are shown in Figs. 3, 4 and 5.

The ring plate 48 is made of plate stock of suitable material, preferably metal, and of suitable thickness, and the corrugated portion of the ring plate 48 is formed by indenting the plate axially in opposite directions, as best shown in Figs. 7 and 8, so as to provide an annular series of circumferentially alternating radial wedge shaped ridges 52 and V-shaped grooves 53 at the upper side of the ring plate 48, and another annular series of circumferentially alternating radial wedge shaped ridges 54 and V-shaped grooves 55 (Fig. 8) at the lower side of the ring plate 48. Each of the two series of alternating ridges and grooves at opposite sides of the plate 48 is uniformly distributed all the way around the ring plate, and the vertexes of the ridges 52 at the upper side of the ring plate 48 register with the grooves 55 at the lower side, and the vertexes of the ridges 54 at the lower side register with the grooves 53 at the upper side.

A complementary coupling section which comprises a pair of disks 56 and 57 is operatively interposed between the stationary ring plate 48 and the shaft 32. The disk 56 is mounted concentrically with the shaft 32 by means of a central rectangular sleeve portion 58 which conforms with the rectangular cross-section of the boss 46 of the shaft 32, as best shown in Fig. 5. The rectangular sleeve portion 58 is rigidly secured to the disk 56 and cooperates with the boss 46 to secure the disk 56 against rotation relative to the shaft 32 in axially slidable relation to the latter. The disk 56 extends radially of the shaft 32 into overlapping relation with the stationary ring plate 48 at the upper side of the latter, and an annular zone at the periphery of the disk 56 is radially corrugated by axially indenting the disk in opposite directions, as best shown in Figs. 7 and 8. The radial corrugations of the disk 56 provide an annular series of circumferentially alternating radial wedge shaped ridges 61 and radial wedge shaped grooves 62 at the underside of the latter. The number and shape of the corrugations of the disk 56 and the distribution of the alternating ridges 61 and grooves 62 circumferentially of the disk 56 are the same as the number and shape of the corrugations of the ring plate 48 and the distribution of the ridges 52 and grooves 53 circumferentially of the plate 48. That is, the entire series of alternating ridges and grooves on the disk 56, like the ridges and grooves of the ring plate 48, are uniformly distributed throughout its circumference, and the apexes of the ridges 61 at the lower side of the disk 56 register with the bottoms of the grooves at the upper side of the disk 54.

The disk 57 is of the same general character as the disk 56 and has a central rectangular sleeve portion 59 which corresponds to the sleeve portion of the disk 56 and by means of which it is mounted concentrically with the shaft 32 for rotation in conjunction therewith and in axially shiftable relation thereto, substantially as explained hereinbefore with reference to the disk 56. It will be noted that the disks 56 and 57 are mounted on the shaft 32 at opposite sides, respectively, of the stationary plate 48 for independent axial shifting movement relative to and conjoint rotation with the shaft 32. An annular zone at the periphery of the disk 57 is radially corrugated by axially indenting the disk in opposite directions, as best shown in Figs. 7 and 8, to provide an annular series of circumferentially alternating radial wedge shaped ridges 64 and V-shaped grooves 66 at the upper side of the disk 57. The number and shape of the corrugations of the disk 57 and the distribution of the alternating ridges 64 and grooves 66 circumferentially of the disk 57 are the same as the number and shape of the corrugations of the ring plate 48 and the distribution of the ridges 54 and V-shaped grooves 55 at the lower side of the ring plate 48. The disk 57, however, is not an exact duplicate of the disk 56 in that the corners of the sleeve 59 and the corrugations at the periphery of the disk 57 are arranged in a circumferentially angular relation to each other which is slightly different from the circumferentially angular relation between the corners of the sleeve 58 and the corrugations at the periphery of the disk 56. That is, the circumferentially angular relation in which the disks 56 and 57 are retained relative to each other by the boss 46 of the shaft 32 is such that the apexes of the ridges 61 (Fig. 8) at the lower side of the disk 56 register with the apexes of the ridges 64 at the upper side of the disk 57 and accordingly, the grooves 62 at the lower side of the disk 56 register with the grooves 66 at the upper side of the disk 57, as best shown in Fig. 8.

Fig. 7 shows the disk 57 in an axial and circumferential position in which the converging sides of the ridges 64 bear against the converging sides of the grooves 55 of the ring plate 48, and in which the converging sides of the grooves 66 of the disk 57 bear against the converging sides of the ridges 54 of the plate 48. A coil spring 67 is operatively interposed between the disk 57 and the lower section of the housing 36, as best shown in Fig. 4, and subjects the disk 57 to axial pressure so that the disk 57 will be resiliently retained in the position relative to the ring plate 48 in which it is shown in Fig. 7 when the ridges 64 and grooves 66 of the disk 57 register with the grooves 55 and ridges 54, respectively, of the ring plate 48. Another coil spring 68 is operatively interposed between the disk 56 and the upper section of the housing 36 as shown in Fig. 4, and in the position of the parts as shown in said figure and in Fig. 7, the coil spring 68 is more compressed than the coil spring 67 and exerts an axial pressure upon the disk 56 so that the ridges 61 of the disk 56 will bear upon the ridges 52 of the ring plate 48.

Referring to Fig. 1, the reaction of the spring 24 is transmitted to the lever arm 31 on the shaft 32 through the link 29, and when the adjusting lever 12 of the governor 3 is in the high speed position H as shown in full lines, the shaft 32 is subject to a strong turning tendency in the direction which is indicated by the arrow D in Figs. 1, 4, 5 and 7. Assuming, that the parts of the detent mechanism are positioned relative to each other as shown in Figs. 4 and 7 when the adjusting lever 12 is in the high speed position, it will be seen that the lever arm 31 and the shaft 32 are restrained from turning under the tension of the spring 24 by engagement of the ridges 64 and grooves 66 of the disk 57 with the grooves 55 and ridges 54, respectively, of the stationary ring plate 48.

If it is desired to move the adjusting lever 12 of the governor 3 to a lower speed position, that is, in the direction of arrow B, the shaft 32 may be turned in the direction of arrow D in Fig. 1 by means of the hand lever 39. As a result of such turning movement of the shaft 32, the disk 57 will be forced axially of the shaft 32 against the pressure of the coil spring 67 and out of locking engagement with the ring plate 48, while at the same time the coil spring 68 will become effective to move the ridges 61 and the grooves 62 of the disk 64 into locking engagement with the grooves 53 and ridges 52, respectively, of the stationary ring plate 48. The change of position of the disks 56 and 57 relative to each other and relative to the ring plate 48 which takes place in response to turning movement of the shaft 32 is illustrated in Fig. 8 which shows the disk 57 moved half-way out of locking engagement with the ring plate 48 and the disk 56 moved half-way into locking engagement with the ring plate 48.

Referring to Fig. 5, part of the upper housing section is broken away to expose the upper coupling disk 56, and part of the coupling disk 56 is broken away to expose the ridges 52 and grooves 53 of the stationary ring plate 48. The angle $x$ between lines coinciding with the vertexes of relatively adjacent ridges 61 on the disk 56 denotes the circumferential angular spacing of these ridges, and as shown in Fig. 5, the angle $x$ is about six degrees. The angle $x'$ in Fig. 5 similarly denotes the relative circumferential angular spacing of the ridges 52 on the disk 48, and which angle is equal to the angle $x$. In view of the explanations hereinabove with reference to Figs. 7 and 8, it will be apparent that the ridges 64 on the lower disk 57 are circumferentially spaced from each other the same predetermined angle $x$ as the ridges 61 on the upper disk, and that the ridges 54 (Fig. 8) at the lower side of the stationary ring plate 48 are circumferentially spaced one half of said angle $x$ from the ridges 52 at the upper side of the ring plate 48. It will further be seen that in view of the stated circumferential relation of the ridges 61 to the ridges 64, and the circumferential relation of the ridges 52 to the ridges 54, the rotatable assembly comprising the lever arm 31, shaft 32, hand lever 39 and coupling section 56, 57 may be secured in rotatively adjusted positions at angular spacings of one-half of the angle $x$, that is, at three degrees angular spacings. The series of ridges 61 and grooves 62 on the upper disk 56 will releasably interlock with the series of ridges 52 and grooves 53 on the stationary coupling section 48 to secure the rotatable assembly 31, 32, 39, 56 and 57 in predetermined rotatably adjusted positions at six degrees angular spacings, and the series of ridges 64 and grooves 66 of the lower disk 57 will releasably interlock with the series of ridges 54 and grooves 55 of the ring plate 48 to secure said rotatable assembly in other predetermined rotatably adjusted positions at six degrees angular spacings from each other, such other predetermined positions, however, being three degrees circumferentially displaced relative to the positions which are determined by interlocking engagement of the ridges 61 and grooves 62 with the ridges 64 and grooves 66.

From the foregoing explanations, it will be seen that the adjusting lever 12 of the governor 3 may be adjusted in very short steps from its high speed position H to the low speed position L, and that the tension of the spring 24 will be adequately taken up by the detent mechanism so that the adjusting lever 12 will not be apt to creep from any adjusted position under the tension of the spring 24 when the whole throttle control apparatus becomes subject to vibration during operation of the internal combustion engine, or due to vibrations which may be set up during operation of a motor vehicle on which the internal combustion engine and the control apparatus are installed.

In the modified construction of the detent mechanism which is illustrated in Figs. 9–16, inclusive, the stationary coupling section comprises two radially corrugated ring plates 69 and 71 which are rigidly secured to the web portions 43 of the housing sections, respectively, as best shown in Fig. 10. The ring plate 69 is made from plate stock of suitable material, preferably metal, and of suitable thickness, and it has a flat radial inner portion which is spaced from the adjacent web portion 43 of the housing by a circumferential series of spacers 72, the spacers being preferably welded to the web portion 43, and the flat portion of the ring plate 69 being welded to the spacers. The ring plate 71 is similarly made and secured to the web portion 43 at the opposite side of the housing 33.

The corrugations of the ring plate 69 are formed by indenting the plate axially in opposite directions as best shown in Fig. 11. It will be noted that each of the corrugations of the ring plate 69 has axially converging wedge surfaces 73 and 74 at different angles, respectively, relative to the plane of the adjacent web portion 43, or in other words, relative to a radial plane through the control shaft 32. As shown in Fig.

11, the angle y between the wedge surface 73 and the mentioned radial plane is about thirty degrees and the angle z between the wedge surface 74 and the mentioned radial plane is about seventy degrees. The corrugations of the ring plate 69 are equally distributed throughout the circumference of the ring plate and form an annular series of circumferentially alternating radial wedge shaped ridges 76 and radial V-shaped grooves 77. The circumferentially angular spacing of the vertexes of the ridges 76 from the bottoms of the grooves 77 is larger in one direction than in the other, or stated in another way, the corrugations of the ring plate 69 are slanted circumferentially so that each corrugation has a relatively gradual slope represented by the wedge surface 74 at one side, and a relative steep slope represented by the wedge surface 73 at the other side.

The ring plate 71 is an opposite hand duplicate of the ring plate 69, that is, the ring plate 71 has an annular series of circumferentially alternating radial wedge shaped ridges 78 and radial V-shaped grooves 79 which correspond respectively, to the ridges 76 and grooves 77 of the ring plate 69, but the slant of the corrugations on the ring plate 71 is opposite hand to the slant of the corrugations of the ring plate 69 so that in the assembled condition of the mechanism, the steep slopes of both ring plates 69, 71 face in one direction circumferentially of the shaft 32, and the more gradual slopes face in the opposite direction, as shown in Figure 11.

The control shaft 32 of the modified detent mechanism as shown in Figs. 9 and 10 has two axially extending bosses 81 and 82, each of which has a square cross-section like the boss 46 on the control shaft 32 shown in Fig. 6. The control shaft 32 of the modified mechanism, like the control shaft 32 of the first described mechanism is suitably retained against axial displacement relative to the housing 33 from the position in which it is shown in Fig. 10.

The rotary coupling section of the modified detent mechanism comprises two disks 83 and 84 which like the ring plates 69 and 71 are made of suitable plate stock and which are operatively interposed, respectively, between the stationary ring plate 69 and the shaft 32 and between the stationary ring plate 71 and the shaft 32. The disk 83 is mounted concentrically with the shaft 32 by means of a central rectangular sleeve portion 86 which conforms with the rectangular cross-section of the boss 81. The sleeve portion 86 is rigidly secured to the disk 83 and cooperates with the boss 81 to secure the disk 83 against rotation relative to the shaft 32 in axially slidable relation to the latter. The disk 83 extends radially of the shaft 32 into overlapping relation with the stationary ring plate 69 at the axially inner side of the latter, and an annular zone at the periphery of the disk 83 is radially corrugated by axially indenting the disk in opposite directions. The explanations hereinbefore with reference to the corrugations of the ring plate 69, that is, with reference to the circumferential angular relation between the ridges and grooves of the ring plate 69 and with reference to the slant of said corrugations, similarly apply to the corrugations of the disk 83. Accordingly, the disk 83 has an annular series of circumferentially alternating radial wedge shaped ridges 88 and radial V-shaped grooves 89 of the same number, shape and circumferential distribution as the wedge shaped ridges 76 and V-shaped grooves 77 of the stationary ring plate 69, with the result that the disk 83 may operatively interlock with the plate 69 as shown in Fig. 11.

The disk 84 is of the same general character as the disk 83 and has a central rectangular sleeve portion 87 which corresponds to the rectangular sleeve portion 86 of the disk 83, the sleeve portion 87 being rigidly connected with the disk 83 and cooperating with the boss 82 to mount the disk 83 concentrically with the shaft 32 for rotation therewith and axial shifting movement relative thereto, substantially as described hereinbefore with reference to the disk 83. It will be noted that the disks 83, 84, like the disks 56 and 57 of the first described mechanism, are mounted for independent axial shifting movement relative to and conjoint rotation with the shaft 32. The explanations hereinbefore with reference to the corrugations of the stationary ring plate 71 similarly apply to the corrugations of the disk 84. That is, the disk 84 has an annular series of circumferentially alternating radial wedge shaped ridges 91 and radial V-shaped grooves 92 of the same number, shape and circumferential distribution as the wedge shaped ridges 78 and the V-shaped grooves 79 of the stationary ring plate 71 so that the disk 84 may operatively interlock with the plate 71 in a manner corresponding to the showing at the right side of Fig. 11, and as will be discussed in fuller detail hereinbelow with reference to Figs. 12 to 16.

As shown in Fig. 11, the ring plates 69 and 71 are secured to the opposite sections of the housing 33 in such circumferential relation to each other that the ridges 76 and the grooves 77 of the ring plate 69 register, respectively, with the ridges 78 and the grooves 79 of the ring plate 71. In Fig. 12, this relation is indicated by the dash-dotted line 95.

As further shown in Fig. 11, the ridges 88 of the disk 83 are circumferentially offset from the ridges 91 of the disk 84, and accordingly the grooves 89 of the disk 83 are also circumferentially offset from the grooves 92 of the disk 84. This relation is indicated in the upper part of Fig. 12 by the double headed arrows Q and ½Q, the arrow Q representing the circumferentially angular spacing of the ridges 92 at the periphery of the disk 84, and the arrow ½Q representing one-half of said circumferentially angular spacing Q. In other words, the circumferential relative displacement of the disks 83 and 84 as shown in Fig. 11 is such that the ridges 88 of the disk 83 fall exactly midway between the ridges 91 on the disk 84.

The relative circumferential displacement of the disks 83 and 84 which determines the mentioned circumferential angular spacing of the ridges 88 and grooves 89 of the disk 83 from the ridges 91 and grooves 92, respectively, of the disk 84 is permanently maintained by cooperation of the hub sleeves 86 and 87 of the disks 83 and 84, respectively, with the rectangular bosses 81 and 82 of the shaft 32. As shown in Fig. 9, the sides of these bosses are axially aligned, and accordingly, the corners of the sleeve 87 and the corrugations at the periphery of the disk 84 must be arranged in a circumferentially angular relation to each other which is slightly different from the circumferentially angular relation between the corners of the sleeve 87 and the corrugations of the disk 83, in order to stagger the ridges 92 of the disk 84 relative to the ridges 89 of the disk 83 as shown in Figs. 11 and 12. The same result, however, may be obtained by making the disk 84 an exact opposite hand duplicate of the disk 83, and by arranging the bosses 81 and 82 in circumferentially displaced positions on the shaft 32, which will afford the desired circumferential displacement of the corrugations of one disk relative to the corrugations of the other disk. In connection with Fig. 18, it will further be shown hereinbelow that the disks 83 and 84 may be made exact opposite hand duplicates of each other and mounted on the bosses 81 and 82, respectively, without necessitating a relative circumferential displacement of the latter from the positions in which they are shown in Figs. 9 and 10.

A single coil spring 93 is operatively interposed in loaded condition between the disks 83 and 84 and exerts axial pressure upon the disks simultaneously in opposite directions so as to force the disk 83 into axial abutment with the ring plate 69 and the disk 84 into axial abutment with the ring plate 71.

The modified detent mechanism may be incorporated in the control apparatus shown in Fig. 1 in lieu of the detent mechanism which has been described hereinbefore in connection with Figs. 3–8, inclusive. The arrow D in Figs. 9 and 10 indicates the direction in which the shaft 32 tends to turn under the tension of the governor spring 24 when the modified detent mechanism is used in the installation shown in Fig. 1. The arrow D in Fig. 11 further indicates the direction in which the disks 83 and 84 tend to rotate in unison with each other relative to the ring plates 69 and 71 under the tension of the governor spring 24. Assuming that the parts of the detent mechanism are positioned relative to each as shown in Fig. 11 when the adjusting lever 12 is in its high speed position as shown in Fig. 1. Rotation of the shaft 32 in the direction of arrow D in Figs. 9 and 10 will then be restrained by cooperative engagement of the steeply sloping faces of the corrugations of the plate 83 with the steeply sloping faces 74 of the plate 69. Accordingly, the tension of the governor spring 24 will be adequately taken up by the detent mechanism, but the disk 83 may be forced out of locking engagement with the plate 69 upon application of a predetermined adjusting torque in the direction of arrow D to the control shaft 32. The relatively steep inclination of the wedge surfaces 74 on the ring plate 69 offers considerable resistance to turning movement of the shaft 32 in the direction of arrow D, but the required adjusting torque which must be applied to the shaft 32 manually by means of the hand lever 39 will be relatively low because of the assistance derived from the tension of the governor spring 24. While the shaft 32 is being rotated in the direction of arrow D and the disk 83 is moved axially to the left in Fig. 11 against the pressure of the coil spring 93, the ridges 91 of the disk 84 move toward the bottoms of the grooves 79 of the plate 71, and after the shaft 32 has been turned through a predetermined angle, the disk 84 becomes lockingly engaged with the plate 71 at the left side of Fig. 11.

Referring to the diagrams of Figs. 12–16, inclusive, Fig. 12 shows the ring plates 69 and 71 and the disks 83 and 84 in the same relative position as Fig. 11 and which position has been assumed hereinbefore to correspond to the high speed position of the adjusting lever 12 of the governor 3. In order to move the adjusting lever 12 to a lower speed position, the shaft 32 may be rotated in the direction of arrow D in Figs. 9 and 10, and when the lever 32 has been turned from the starting position through an angle of approximately one and one-half degrees, which is represented in Fig. 13 by the double headed arrow 101, the parts of the detent mechanism will occupy a relative position as shown in Fig. 13. That is, the ridges 88 of the disk 83 will be moved slightly beyond the ridges 76 of the ring plate 69, and the ridges 91 of the disk 84 will be moved somewhat closer toward the grooves 79 of the ring plate 71. Upon turning of the hand lever 39 from the starting position through an angle of approximately three degrees, which is represented by the double headed arrow 102 in Fig. 14, the parts of the detent mechanism will be positioned relative to each other as shown in Fig. 14. That is, the ridges 91 of the disk 84 will become snugly seated in the grooves 79 of the disk 71, and the ridges 78 of the disk 71 will be snugly seated in the grooves 92 of the disk 84, so that the disk 84 will be operatively interlocked with the ring plate 71. In this condition of the mechanism, the tension of the governor spring 24 will be taken up by engagement of the steeply sloping sides of the corrugations of the disk 84 with the steeply sloping sides of the corrugations on the ring plate 71, while the disk 83 is substantially released from locking engagement with the ring plate 69. Upon turning movement of the hand lever 39 from the starting position through an angle of approximately four and one-half degrees which is represented by the double headed arrow 103 in Fig. 15, the parts of the detent mechanism will be positioned as shown in Fig. 15. That is, the disk 84 will be substantially released from locking engagement with the ring plate 71, and the disk 83 will have approached locking engagement with the ring plate 69 but will not yet be fully interlocked with said plate. Upon rotation of the hand lever 39 through an angle of approximately six degrees from the starting position, which is represented by the double headed arrow 104 in Fig. 16, the parts of the detent mechanism will be positioned as shown in said figure. That is, the disk 83 will be lockingly engaged with the ring plate 69, and the disk 84 will be substantially released from locking engagement with the ring plate 71, the same as in Fig. 12.

From the foregoing explanations, it will be seen that the rotatable assembly comprising the lever arm 31, shaft 32, hand lever 39 and coupling sections 83, 84 may be secured in rotatively adjusted positions at relatively close angular spacings from each other, which will provide for a desirably fine adjustment of the adjusting lever 12 of the governor 3.

Considering the modified detent mechanism as an independent unit, that is, without regard to a constant turning tendency such as is induced by the governor spring 24, it will be noted that the mode of operation of the modified construction differs from the mode of operation of the first described form of detent mechanism. Such difference resides in the fact that in the first described form, the control shaft is locked against rotation with the same degree of efficiency in both directions, whereas in the modified form the control shaft is locked against rotation more effectively in one direction than in the other. In other words, in the modified construction, the rotatable coupling section will be forced out of cooperative engagement with the stationary coupling section upon application of a relatively high total torque to the control shaft 32 in the direction of arrow D, and alternatively, upon application of a relatively low total torque to the control shaft in the opposite direction. This result is obtained by the inequality of the angles *y* and *z* in Fig. 11, as will be readily apparent.

When the modified form of detent mechanism is incorporated in the installation shown in Fig. 1, the tension of the governor spring 24 subjects the shaft 32 to considerable torque in the direction of arrow D. as pointed out hereinbefore, and a predetermined torque must be exerted by hand in the same direction in order to release the detent mechanism when it is desired to adjust the lever 12 of the governor 3 in the direction of arrow B in Fig. 1. On the other hand, if it is assumed that the adjusting lever 12 of the governor is set to a relatively low speed position, and it is desired to adjust it to a higher speed position, a predetermined torque must be applied to the hand lever 13 in a direction opposite to arrow D in order to release the detent mechanism. Such opposite torque will have to be strong enough to overcome the tension of the spring 24, but the detent mechanism will yield more readily because of the more gradual slope of the cooperating surfaces which is determined by the angle *y* in Fig. 11. The angles *y* and *z* are preferably so proportioned that approximately the same adjusting torque must be applied to the hand lever 39 in either direction in order to release the detent mechanism.

Generally considered, the housing 36 of the modified detent mechanism shown in Figs. 9 and 10 represents a support, the lever arm 31 (Fig. 1) represents a control element which is mounted for adjusting movement in angularly fixed relation to said support, and the ring plate 69 and the disk 83 represent one pair, and the ring plate 71 and disk 84 represent another pair of wedgingly engageable coupling elements which are operatively interposed, in resiliently abutting relation to each other, between the support 33 and the control element 31. The movable coupling elements, which are represented by the disks 83 and 84, are mounted for shifting movement and for adjusting movement in a plane at right angles to the direction of said shifting movement and they have oppositely inclined wedge surfaces at different angles to said plane. These different angles correspond to the angles *y* and *z* which have been referred to hereinbefore in connection with the ring plate 69, and they determine the inclination of the wedge surfaces of the movable coupling elements relative to the plane in which the control element or lever arm 31 is adjustable relative to the support 36.

As pointed out hereinbefore, each coupling section comprises two annular series of circumferentially alternating radial wedge shaped ridges and V-shaped grooves, namely, the series 76, 77 and the series 78, 79 on the stationary coupling section, and the series 88, 89 and the series 91, 92 on the rotatable coupling section. The critical relation between the coupling sections which provides for rotary adjustment of the shaft 32 in equal steps, as explained hereinbefore with reference to Figs. 12–16, inclusive, may be obtained in various ways.

According to Fig. 11, this critical relation is obtained, as pointed out hereinbefore, by mounting the rotary disks 83 and 84 in such angular positions relative to each other on the shaft 32 that the ridges 89 of the disk 83 fall exactly midway between the ridges 92 of the disk 84, and by mounting the stationary disks 69 and 71 on the housing 33 in such angular positions relative to each other that ridges 76 and the grooves 77 of the plate 69 register, respectively, with the ridges 78 and with the grooves 79 of the plate 71. Generally stated, the desired rotary adjustment of the shaft 32 in equal steps may be obtained by constructing the mechanism so that:

a. The ridges of one series on one coupling section fall midway between the ridges of the other series on said one coupling section; and b. That the ridges and grooves of one series on the other coupling section register with the ridges and grooves, respectively, of the other series on said other coupling section.

The foregoing principle, however, is not the only principle on which the mechanism may be constructed in order to provide for rotary adjustment of the shaft 32 in equal steps. An alternative way of constructing the mechanism so as to obtain this result is to construct it in such a manner that:

c. The grooves of one series on one coupling section fall midway between the ridges of the other series on said one coupling section, and d. That the ridges of one series on the other coupling section register with the grooves of the other series on said other coupling section.

Fig. 17 illustrates diagrammatically a relative arrangement of the stationary coupling plates 69, 71 and a relative arrangement of the rotatable coupling disks 83 and 84 in conformity with the conditions c and d which have been pointed out hereinbefore. In the upper part of Fig. 17, the circumferentially angular spacing between adjacent ridges 78 on the stationary plate 71 is indicated by the double headed arrow P, and it will be noted that the grooves 77 of the stationary plate 69 fall midway between the ridges 78 of the plate 71, as indicated by the double headed arrow ½P. As further indicated by the dash-dotted line 94 in Fig. 17, the ridges 88 of the coupling disk 83 register with the grooves 92 of the coupling disk 84.

Fig. 18 illustrates diagrammatically a modified relative arrangement of the stationary coupling plates 69, 71 and of the rotatable coupling disks 83, 84 in conformity with the conditions *a* and *b* above. As indicated in the upper part of Fig. 18 by the arrows P and ½P, the ridges 76 of the stationary coupling plate 69 fall midway between the ridges 78 of the stationary coupling plate 71, and as indicated by the dash-dotted line 96 in Fig. 18, the grooves 89 of the rotary coupling disk 83 register with the grooves 92 of the rotary coupling disk 84, and accordingly, the ridges 88 of the rotary coupling disk 83 register with the ridges 91 of the coupling disk 84. In this arrangement the disks 83, 84 may be exact opposite hand duplicates of each other and mounted on a common boss, such as the boss 46 of the shaft 32 (see Fig. 6).

Fig. 19 illustrates another relative arrangement of the stationary coupling plates 69 and 71 and of the rotary coupling disks 83 and 84 in conformity with the conditions, c and d mentioned hereinabove. The circumferentially angular spacing of adjacent ridges 91 of the coupling disk 84 is indicated in the upper part of Fig. 19 by the double headed arrow Q (which is of the same length as the double headed arrow P in Figs. 17 and 18) and it will be noted that the grooves 89 of the rotary coupling disk 83 fall midway between the ridges 91 of the coupling disk 84 as indicated by the double headed arrow ½Q in Fig. 19. As further indicated by the dash-dotted line 97 in Fig. 19, the ridges 76 of the stationary coupling plate 69 register with the grooves 79 on the stationary coupling disk 71.

Fig. 20 illustrates another possible arrangement of the stationary coupling plates 69 and 71 and of the rotary coupling disks 83 and 84 in conformity with the conditions c and d which have been pointed out hereinbefore. As indicated by the double headed arrows Q and ½Q in the upper part of Fig. 20, the grooves 92 of the coupling disk 84 fall midway between the ridges 88 of the coupling disk 83. As further indicated by the dash-dotted line 98 in Fig. 20, the ridges 78 of the stationary coupling plate 71 register with the grooves 77 of the coupling plate 69.

The mode of operation of the detent mechanism if constructed in conformity with any one of the arrangements illustrated in Figs. 17-20, inclusive, is substantially the same as described hereinbefore in connection with Figs. 12-16, inclusive, that is, the shaft 32 will be rotatively adjustable in equal steps of three degrees spacings.

Fig. 21 diagrammatically illustrates a relative arrangement of the stationary coupling plates 69 and 71 and of the rotary coupling disks 83 and 84 which will provide for rotary adjustment of the shaft 32 in relatively large steps, that is, steps twice as large as those afforded by the arrangements illustrated in Figs. 12 and 17 through 20, inclusive. However, it will be noted that the arrangement shown in Fig. 21 like the arrangement shown in Fig. 11 provides a detent mechanism in which the control shaft 32 will be restrained against rotation in one direction more effectively than in the other.

With reference to Fig. 11, and considering the ridges 76 and the grooves 77 of the plate 69 as a first annular series of alternating ridges and grooves, and the ridges 78 and the grooves 79 of the plate 71 as a second annular series of alternating ridges and grooves, it will be seen that such first and second series are formed on the stationary coupling section so that the circumferentially angular spacing of the ridges and the circumferentially angular spacing of the grooves of said first series are the same as the circumferentially angular spacing of the ridges and the circumferentially angular spacing of the grooves, respectively, of the second series. Considering further the ridges 88 and the grooves 89 of the disk 83 as a third annular series of ridges and grooves, and the ridges 91 and the grooves 92 of the disk 84 as a fourth series of ridges and grooves, it will be seen that the ridges and grooves of said third and fourth annular series are formed on the rotatable coupling section so that the circumferentially angular spacings of the ridges and grooves, respectively, of said third series, and the circumferentially angular spacings of the ridges and grooves, respectively, of said fourth series are the same as said circumferentially angular spacings of the ridges and grooves of said first and second series. It will further be noted that the stationary and rotatable coupling sections are mounted in operative relation to each other so that the ridges and grooves of said first series register, respectively, with the ridges and grooves of said second series, and so that the ridges and grooves of said third series are circumferentially displaced relative to the ridges and grooves, respectively, of said fourth series. As shown in Figs. 11 and 12, the ridges of the third series, that is, the ridges 88, fall substantially midway between the ridges of the fourth series, that is, the ridges 91.

The foregoing considerations analagously apply to the form of mechanism shown in Figs. 3 and 7, and to the form of mechanism shown in Fig. 18. With reference to Fig. 7, the first and second series may be assumed to be represented by the ridges and grooves of the rotatable disks 56 and 57, respectively, and the third and fourth series may be assumed to be represented by the ridges and grooves at the upper and lower sides, respectively, of the stationary ring plate 48. With reference to Fig. 18, the first and second series may be assumed to be represented by the ridges and grooves of the rotatable disks 83 and 84, respectively, and the third and fourth series may be assumed to be represented by the ridges and grooves of the stationary plates 69 and 71, respectively.

With reference to Fig. 17, and considering the ridges 88 and the grooves 89 of the disk 83 as a first annular series of alternating ridges and grooves, and the ridges 91 and the grooves 92 of the disk 84 as a second annular series of alternating ridges and grooves, it will be seen that such first and second series are formed on the rotatable coupling section so that the vertexes of the ridges of said first series register with the bottoms of the grooves of said second series. And considering the ridges 76 and the grooves 77 as a third series, and the ridges 78 and the grooves 79 as a fourth series, it will be noted that the circumferentially angular spacing of the ridges and the circumferentially angular spacing of the grooves of each of said third and fourth series are equal, respectively, to the circumferentially angular spacing of the ridges and to the circumferentially angular spacing of the grooves of said first and second series, and that the bottoms of the grooves of said third series are circumferentially displaced relative to the vertexes of the ridges of said fourth series. With these alternative definitions in mind, it will be seen that in the form of the mechanism as shown in Fig. 17, the bottoms of the grooves of the third series fall midway between the vertexes of the ridges of the fourth series.

The foregoing considerations analogously apply to the form of mechanism shown in Figs. 3 and 7, and to the forms of mechanism shown in Figs. 19 and 20. With reference to Fig. 7, the first and second series, in this case, may be assumed to be represented by the ridges and grooves at the upper and lower sides, respectively, of the stationary ring plate 48, and the third and fourth series may be assumed to be represented by the ridges and grooves of the rotatable disks 56 and 57, respectively. With reference to Fig. 19, the first and second series may be assumed to be represented by the ridges and grooves of the stationary plates 69 and 71, respectively, and the third and fourth series may be assumed to be represented by the ridges and grooves of the rotatable disks 83 and 84, respectively. With reference to Fig. 20, the first and second series may be assumed to be represented by the ridges and grooves of the stationary plates 71 and 69, respectively, and the third and fourth series may be assumed to be represented by the ridges and grooves of the rotatable disks 84 and 83, respectively.

In connection with Fig. 10, it has been pointed out hereinbefore that the annular series of circumferentially alternating radial wedge shaped ridges 76 and radial V-shaped grooves 77 are formed on a ring plate 69 which is secured to the inside of the web portion 43 of one housing section, and that the annular series of circumferentially alternating radial wedge-shaped ridges 78 and radial V-shaped grooves 79 are formed on a ring plate 71 which is secured to the inside of the web portion 43 of the other housing section. Fig. 22 shows a construction of the mechanism in which the ring plates 69 and 71 are dispensed with and in which the ridges 76 and grooves 77 are formed integrally with one housing section, and the ridges 78 and grooves 79 are formed integrally with the other housing section. As shown in Fig. 22, a housing which encloses the rotary coupling disks 83, 84 comprises two sections 106 and 107 which are generally similar to the housing sections of the mechanism shown in Fig. 10 in that each comprises a central hub sleeve 41, a disk-like web portion 43 extending in a generally radial direction from the hub sleeve 41, and a peripheral annular flange portion for bolting the two housing sections together. Bushings 47 for mounting the control shaft 32 are secured within the hub sleeves 41 of the housing sections 106 and 107, the same as in the construction shown in Figs. 4 and 10. An annular series of circumferentially alternating ridges and grooves corresponding to the ridges 76 and grooves 77 of the ring plate 69 are formed on the housing section 106 by indenting the web portion 43 of said housing section axially in opposite directions, so that the depressions forming the ridges 76 will protrude at the inner side of the web portion 43 and the depressions forming the grooves 77 will protrude at the outer side of the web portion 43. Another annular series of circumferentially alternating ridges and grooves corresponding to the ridges 78 and grooves 79 of the ring plate 71 are formed on the housing section 107 by axially indenting its web portion in opposite directions so that the depressions forming the ridges 78 will protrude at the inner side and the depressions forming the grooves 79 will protrude at the outer side of the web portion 43 of the housing section 107. For manufacturing purposes the entire housing section 106 is preferably formed in one piece by pressing a plate metal blank into the desired shape, and the entire housing section 107 is likewise formed in one piece. The mode of operation of the detent mechanism shown in Fig. 22 is the same as that of the mechanism shown in Figs. 9 and 10, and the various principles discussed hereinbefore in connection with Figs. 17 to 22 may readily be incorporated in the form of mechanism shown in Fig. 22.

In the form of mechanism shown in Fig. 22 the web portions 43 of the housing sections 106 and 107 represent radially corrugated plate elements, and it will be noted that in this instance such plate elements form axially opposite side walls, respectively, of a housing structure enclosing the rotatable coupling disks 83, 84.

It should be understood that it is not intended to limit the invention to the particular forms and details described hereinabove and that the invention includes such other forms and modifications as are embraced by the scope of the appended claims.

It is claimed and desired to secure by Letters Patent:

1. A lever detent mechanism comprising, in combination, a support, a control element rotatably mounted on said support, a pair of coupling elements mounted on said control element for independent axial shifting movement relative thereto and conjoint rotation therewith, a first annular series of circumferentially alternating radial ridges and radial grooves formed on said support concentrically with said control element in face to face relation with one of said coupling elements, a second annular series of circumferentially alternating radial ridges and radial grooves formed on said support concentrically with said rotary control element in face to face relation with the other of said coupling elements, a third and a fourth annular series of circumferentially alternating radial ridges and radial grooves formed, respectively, on said coupling elements concentrically with said control element, the grooves of said first series being adapted to accommodate the ridges of said third series upon adjustment of said control element to predetermined positions in which the ridges of said fourth series are circumferentially displaced relative to the grooves of said second series, and the grooves of said second series being adapted to accommodate the ridges of said fourth series upon adjustment of said control element to other predetermined positions in which the ridges of said third series are circumferentially displaced relative to the grooves of said first series, and resilient means urging said coupling elements, respectively, toward said first and second series of annular ridges and grooves.

2. A lever detent mechanism as set forth in claim 1, in which said support comprises two stationary radially corrugated plate elements non-rotatably mounted at a predetermined axial spacing from each other concentrically with said rotatable control element, and in which said complementary coupling elements comprise two radially corrugated rotatable disk elements mounted on said control element in the space between said stationary plate elements for independent axial shifting movement relative to and conjoint rotation with said control element, and in which said resilient means react between said shiftable disk elements.

3. A lever detent mechanism as set forth in claim 2, in which said resilient means comprise a single coil spring mounted coaxially with said control element between said shiftable disk elements.

4. A lever detent mechanism as set forth in claim 2, in which the corrugations of said plate members are slanted circumferentially so that each corrugation has a relatively gradual slope at one side and a relatively steep slope at the other, and in which each stationary plate element is an opposite hand duplicate of the other.

5. A lever detent mechanism as set forth in claim 2, in which said stationary radially corrugated plate elements form axially opposite side walls, respectively, of a housing structure enclosing said rotatable disk elements.

6. A lever detent mechanism comprising, in combination, a support, a rotatable control element, and a pair of wedgingly engageable coupling elements operatively interposed, in resiliently abutting relation to each other, between said support and said control element, one of said coupling elements having oppositely inclined wedge surfaces at unequal angles, respectively, relative to a radial plane through said control element, and the other of said coupling elements having complementary converging groove surfaces cooperable, respectively, with said wedge surfaces of said one coupling element so that said coupling elements will be forced out of cooperative engagement with each other upon application of a relatively high torque to said control element in one direction and, alternatively, upon application of a relatively low torque to said control element in the opposite direction.

7. In a control mechanism comprising a support and a rotatable control element biased to turn in one direction relative to said support, the combination of a pair of wedgingly engageable coupling elements operatively interposed, in resiliently abutting relation to each other, between said support and said control element, and having complementary pairs of oppositely inclined wedge surfaces and converging groove surfaces cooperable with each other to secure said control element in pivotally adjusted position and to force said coupling elements out of cooperative engagement with each other upon rotation of said control element in opposite directions, the wedge and groove surfaces of said coupling elements which coact to secure said control element against rotation in said one direction having a relatively large angle relative to a radial plane through said control element, and the wedge and groove surfaces of said coupling elements which coact to secure said control element against rotation in the opposite direction having a relatively small angle relative to said plane, so that said control element will be restrained against rotation in said one direction more effectively than in the other.

8. A lever detent mechanism comprising, in combination, a rotatable and a non-rotatable coupling section, a first and a second annular series of circumferentially alternating radial ridges and radial grooves formed on one of said coupling sections so that the circumferentially angular spacing of the ridges and the circumferentially angular spacing of the grooves of said first series are the same as the circumferentially angular spacing of the ridges and the circumferentially angular spacing of the grooves, respectively, of said second series, a third and a fourth annular series of circumferentially alternating radial ridges and radial grooves formed on the other of said coupling sections so that the circumferentially angular spacings of the ridges and grooves, respectively, of said third series and the circumferentially angular spacings of the ridges and grooves, respectively, of said fourth series are the same as said circumferentially angular spacings of the ridges and grooves of said first and second series, and means mounting said coupling sections in operative relation to each other so that the ridges and grooves of said first series register, respectively, with the ridges and grooves of said second series, and so that the ridges and grooves of said third series are circumferentially displaced relative to the ridges and grooves, respectively, of said fourth series.

9. A lever detent mechanism as set forth in claim 8, in which the ridges of said third series fall substantially midway between the ridges of said fourth series.

10. A lever detent mechanism comprising, in combination, a rotatable and a non-rotatable coupling section, a first and a second annular series of circumferentially alternating radial ridges and radial grooves formed on one of said coupling sections so that the circumferentially angular spacing of the ridges and the circumferentially angular spacing of the grooves of said first series are the same as the circumferentially angular spacing of the ridges and the circumferentially angular spacing of the grooves, respectively, of said second series, a third and a fourth annular series of circumferentially alternating radial ridges and radial grooves formed on the other of said coupling sections so that the circumferentially angular spacings of the ridges and grooves, respectively, of said third series and the circumferentially angular spacings of the ridges and grooves, respectively, of said fourth series are the same as said circumferentially angular spacings of the ridges and grooves of said first and second series, and means mounting said coupling sections in operative relation to each other so that the ridges of said first series register, respectively, with the grooves of said second series, and so that the grooves of said third series are circumferentially displaced relative to the ridges of said fourth series.

11. A lever detent mechanism as set forth in claim 10, in which the grooves of said third series fall substantially midway between the ridges of said fourth series.

12. A lever detent mechanism comprising, in combination, a stationary support, a rotatable control element, complementary coupling sections operatively associated, respectively, with said support and with said control element, one of said coupling sections having a first and a second annular series of circumferentially alternating radial wedge shaped ridges and radial V-shaped grooves formed thereon in such angular relation to each other than the vertexes of the ridges and the bottoms of the grooves of said first series substantially register circumferentially with the vertexes of the ridges and with the bottoms of the grooves, respectively, of said second series, and the other of said coupling sections having a third and a fourth annular series of circumferentially alternating radial wedge shaped ridges and radial V-shaped grooves formed thereon so that the circumferentially angular spacing of the ridges and the circumferentially angular spacing of the grooves of each of said third and fourth series are equal, respectively, to the circumferentially angular spacing of the ridges and to the circumferentially angular spacing of the grooves of said first and second series, and so that the vertexes of the ridges and the bottoms of the grooves of said third series are circumferentially displaced relative to the vertexes of the ridges and the bottoms of the grooves, respectively, of said fourth series, and means operative to urge said coupling sections into cooperative engagement with each other so that said first series of ridges and grooves will releasably interlock with said third series of ridges and grooves to secure said rotatable control element in predetermined rotatably adjusted positions relative to said support and so that said second series of ridges and grooves will releasably interlock with said fourth series of ridges and groove to secure said rotatable control element in other predetermined rotatably adjusted positions relative to said support.

13. A lever detent mechanism as set forth in claim 12, in which the vertexes of the ridges of said first and second series fall substantially midway between the bottoms of the grooves of said first and second series, respectively.

14. A lever detent mechanism as set forth in claim 12, in which the vertexes of the ridges of said third series fall substantially midway between the vertexes of the ridges of said fourth series.

15. A lever detent mechanism as set forth in claim 14, in which the angle of circumferential displacement of the vertexes of the ridges from the bottoms of the grooves, in each annular series of ridges and grooves, is larger in one direction than in the other.

16. A lever detent mechanism comprising, in combination, a stationary support, a rotatable control element, complementary coupling sections operatively associated, respectively, with said support and with said control element, one of said coupling sections having a first and a second annular series of circumferentially alternating radial wedge shaped ridges and radial V-shaped grooves formed thereon so that the vertexes of the ridges of said first series substantially register with the bottoms of the grooves of said second series, and the other of said coupling sections having a third and a fourth annular series of circumferentially alternating radial wedge shaped ridges and radial V-shaped grooves formed thereon so that the circumferential angular spacing of the ridges and the circumferentially angular spacing of the grooves of each of said third and fourth series are equal, respectively, to the circumferentially angular spacing of the ridges and to the circumferentially angular spacing of the grooves of said first and second series, and so that the grooves of said third series are circumferentially displaced relative to the ridges of said fourth series; and means operative to urge said coupling sections into cooperative engagement with each other so that said first series of ridges and grooves will releasably interlock with said third series of ridges and grooves to secure said rotatable control element in predetermined rotatably adjusted positions relative to said support and so that said second series of ridges and grooves will releasably interlock with said fourth series of ridges and grooves to secure said rotatable control element in other predetermined rotatably adjusted positions relative to said support.

17. A lever detent mechanism as set forth in claim 16, in which the vertexes of the ridges of said first and second series fall substantially midway between the bottoms of the grooves of said first and second series, respectively.

18. A lever detent mechanism as set forth in claim 16, in which the bottoms of the grooves of said third series fall substantially midway between the vertexes of the ridges of said fourth series.

19. A lever detent mechanism as set forth in claim 18, in which the angle of circumferential diplacement of the vertexes of the ridges from the bottoms of the grooves, in each annular series of ridges and grooves, is larger in one direction than in the other.

20. A lever detent mechanism comprising, in combination, a support, a control element rotatably mounted on said support, a stationary annular plate element mounted on said support concentrically with said control element and having radially extending corrugations at opposite sides thereof, the ridges at one side of said plate element registering circumferentially, with the grooves at the other side thereof, a pair of rotatable radially corrugated plate elements mounted on said control elements at opposite sides, respectively, of said stationary plate element for independent axial shifting movement relative to and conjoint rotation with said control element, the mutually facing ridges and the mutually facing grooves of said rotatable plate elements, respectively, registering circumferentially with each other, and spring means reacting upon said rotatable plate elements, respectively, and upon said support to couplingly engage the corrugations of said rotatable plate elements with the corrugations of said stationary plate element.

21. A lever detent mechanism comprising, in combination, a support, a control element mounted for adjusting movement in angularly fixed relation to said support, and a pair of wedgingly engageable coupling elements operatively interposed, in resiliently abutting relation to each other, between said support and said control element, one of said coupling elements having oppositely inclined wedge surfaces at unequal angles, respectively, relative to the plane in which said control element is adjustable relative to said support, and the other of said coupling elements having complementary converging groove surfaces cooperable, respectively, with said wedge surfaces of said one coupling element so that said coupling elements will be forced out of cooperative engagement with each other upon application of a relatively high moving force to said control element in one direction and, alternatively, upon application of a relatively low moving force to said control element in the opposite direction.

THOMAS J. FLAMM.

REFERENCES CITED

The following references are of record in the file of this patent:

UNITED STATES PATENTS

| Number | Name | Date |
| --- | --- | --- |
| 1,578,383 | Bayles et al. | Mar. 30, 1926 |

Certificate of Correction

Patent No. 2,465,720.  March 29, 1949.

THOMAS J. FLAMM

It is hereby certified that errors appear in the printed specification of the above numbered patent requiring correction as follows:

Column 20, line 29, claim 12, for the word "than" read *that*; line 58, same claim, for "groove" read *grooves*; column 22, line 11, claim 20, for "elements" read *element*; and that the said Letters Patent should be read with these corrections therein that the same may conform to the record of the case in the Patent Office.

Signed and sealed this 2nd day of August, A. D. 1949.

[SEAL]

THOMAS F. MURPHY,
*Assistant Commissioner of Patents.*